US006875156B1

(12) United States Patent
Steiger

(10) Patent No.: US 6,875,156 B1
(45) Date of Patent: Apr. 5, 2005

(54) TRANSMISSION CONTROLLER AND A METHOD OF USE

(76) Inventor: Michael Steiger, 701 Inwood Dr., Campbell Santa Clara, CA (US) 95008-4409

( * ) Notice: Subject to any disclaimer, the term of this patent is extended or adjusted under 35 U.S.C. 154(b) by 0 days.

(21) Appl. No.: 10/260,117

(22) Filed: Sep. 27, 2002

(51) Int. Cl.[7] .............................................. F15H 61/26
(52) U.S. Cl. ....................................................... 477/158
(58) Field of Search ........................... 701/60; 477/121, 477/156, 158, 159, 160, 161

(56) References Cited

U.S. PATENT DOCUMENTS

| 4,393,732 A | * | 7/1983 | Suzuki et al. ............... 477/125 |
| 4,611,285 A | | 9/1986 | Weisman, II |
| 4,956,776 A | | 9/1990 | Carre |
| 5,123,302 A | | 6/1992 | Brown et al. |
| 5,365,437 A | | 11/1994 | Cunningham et al. |
| 5,957,807 A | | 9/1999 | Takamatsu |
| 6,019,293 A | | 2/2000 | Noda et al. |
| 6,022,293 A | * | 2/2000 | Dourra et al. ............... 477/158 |
| 6,107,108 A | | 8/2000 | Last |
| 6,122,582 A | | 9/2000 | Ueda |
| 6,398,693 B1 | * | 6/2002 | Kawamura ................... 477/158 |
| 6,514,175 B2 | * | 2/2003 | Taniguchi et al. ........... 477/156 |

* cited by examiner

Primary Examiner—Roger Pang
(74) Attorney, Agent, or Firm—Sawyer Law Group LLP

(57) ABSTRACT

A system and method for controlling a transmission with an automotive vehicle is disclosed. The automotive vehicle includes a powertrain control module (PCM) and a governor pressure sensor coupled to the PCM. The system and method comprises a controller system for sensing at least one parameter of the vehicle. The controller system modifies an excitation voltage to the governor pressure sensor based upon the at least one parameter. A system and method in accordance with the present invention compensates the erroneous shift points in a transmission by ramping the excitation voltage based upon engine and vehicle parameters. In so doing, upshift and downshift points are corrected. Furthermore, the settings for the excitation voltage range can be user-specified to accommodate a variety of vehicles.

19 Claims, 2 Drawing Sheets

TRANSMISSION CONTROLLER AND A METHOD OF USE

FIELD OF THE INVENTION

The present invention relates generally to automotive vehicles and particularly to an automatic transmission controller for automotive vehicles.

BACKGROUND OF THE INVENTION

An automobile automatic transmission utilizes a hydraulic governor to provide a varying pressure proportional to the speed of the output shaft of the transmission. There is also a mechanism in the transmission to provide a hydraulic pressure proportional to the throttle position, referred to as throttle pressure. The shift points are determined by a combination of the governor pressure and the throttle pressure. An electronic closed-loop system comprising a variable force solenoid and a hydraulic pressure sensor is used to control the governor pressure. The electronics that provide this function are contained in the powertrain control module (PCM). FIG. 1 illustrates a conventional PCM 10 coupled to various sensors. In an example, the Chrysler 47RE & 48RE series of transmissions require electronic control of a hydraulic governor 12 that utilizes a variable-force solenoid 14 and a pressure sensor 16 to provide feedback. The shift points are determined by the throttle pressure and governor hydraulic pressure which is controlled by the PCM 10. The PCM 10 applies an algorithm that causes the governor pressure to vary from an otherwise linear relationship to vehicle speed based upon the vehicle speed sensor 20 and throttle position sensor 22. There are several curves employed in the PCM 10 for use in different climatic and operational environments.

It is common practice to add aftermarket engine performance enhancements to vehicles. Relatively small torque increases (100+ ft. lbs.) can cause torque converter clutch slippage, particularly at part throttle. A common technique to overcome this problem is to adjust the hydraulic line pressure 18 (on the order of +8–10 psi) in the transmission. This adjustment is provided by an adjustment screw on the valve body of the transmission. This additional pressure in turn allows proportionally higher hydraulic pressure on the torque converter clutch and the various clutches and bands in the transmission, thus mitigating or eliminating minor slippage.

Modification of the line pressure beyond the manufacturer's specification also causes side effects, including, but not necessarily limited to:

1. Loss of full-throttle first-to-second gear upshift;
2. Vacillation between first and second gear at low speed and light throttle application;
3. Early upshifts; and
4. No 2-1 downshift resulting in second gear starts.
5. PCM error codes reported due to the line pressure being out of a predetermined range.

Presumably, the calibration of the governor pressure vs. throttle pressure is thrown off, causing some or all the aforementioned side effects.

The governor pressure is balanced against throttle pressure which determines the upshift point. The effect of raised line pressure at some point reverses the lower shift point side effect to a higher shift point side effect. This is evident by the fact that no 1-2 upshift occurs at full throttle. The actual cause has not been extensively investigated, but presumably, it is due to the governor pressure not reaching the point at fill throttle to cause a 1-2 upshift. A common solution to these problems is to add a resistor or voltage regulator in series with the sensor excitation voltage lead 24 from the PCM 10 to the transmission. This practice is not without its own side effects, though. While curing some of the side effects, other shift points are earlier as a result of the higher governor pressure, which is generally undesirable.

Accordingly, what is needed is a system and method that allows the use of increased line pressure to overcome the problem of clutch slipping while minimizing the above-identified problems with conventional solutions. The present invention addresses such a need.

SUMMARY OF THE INVENTION

A system and method for controlling a transmission with an automotive vehicle is disclosed. The automotive vehicle includes a powertrain control module (PCM) and a governor pressure sensor coupled to the PCM. The system and method comprises a controller system for sensing at least one parameter of the vehicle. The controller system modifies an excitation voltage to the governor pressure sensor based upon the at least one parameter.

A system and method in accordance with the present invention compensates erroneous shift points in a transmission by ramping the excitation voltage based upon engine and vehicle parameters. In so doing, upshift and downshift points are corrected. Furthermore, the settings for the excitation voltage range can be user-specified to accommodate a variety of vehicles.

DETAILED DESCRIPTION

The present invention relates generally to automotive vehicles and particularly to an automatic transmission controller for automotive vehicles. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
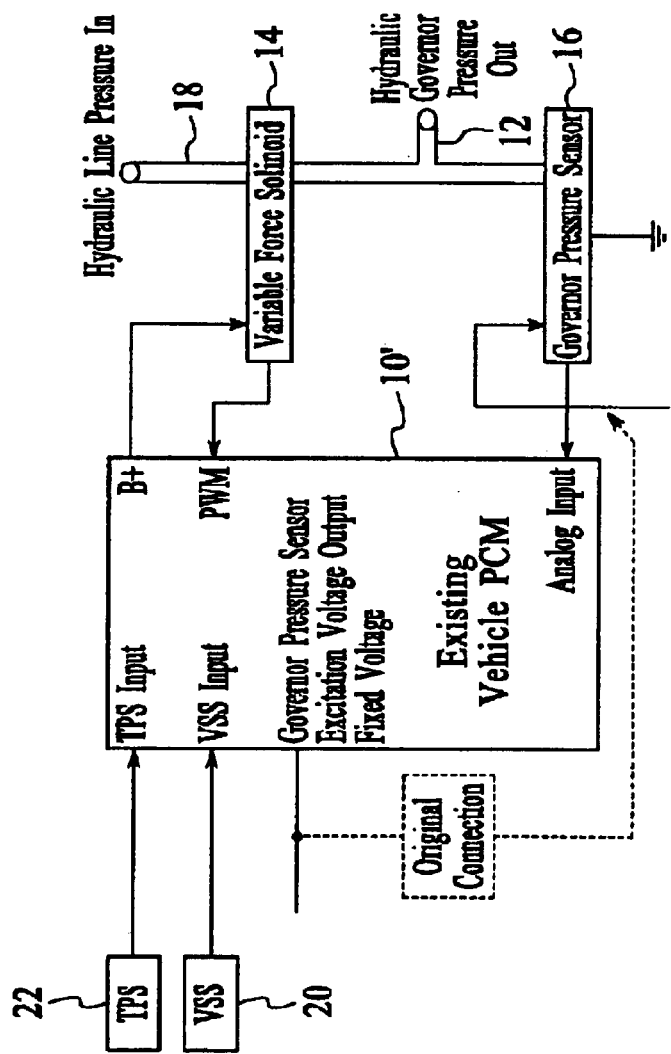
FIG. 1 illustrates a typical Powertrain Control Module (PCM) utilized in existing vehicles.
Figure 2:
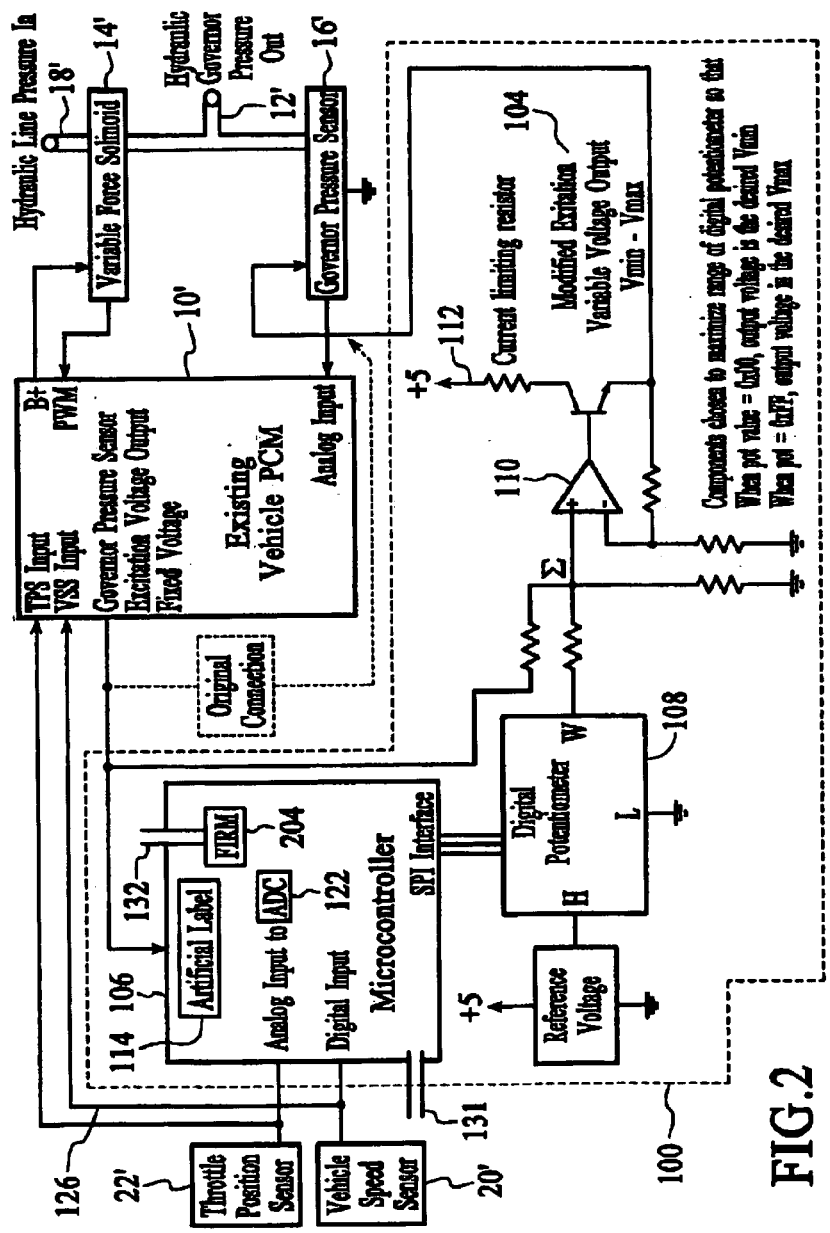
FIG. 2 illustrates a controller system in accordance with the present invention coupled to a conventional PCM which is within an automotive vehicle (not shown).

FIG. 2 illustrates a controller system 100 in accordance with the present invention coupled to a conventional PCM 10' which is within an automotive vehicle (not shown). The controller system 100 ramps excitation voltage 104 to the governor pressure sensor 16' based on throttle position, speed, or a combination of the two. In a typical application, the excitation voltage 104 is ramped from +10% at 0% throttle to −10% at 30 or 40% throttle position. This "fools" the closed loop system into thinking that the pressure is higher when the excitation voltage is higher, resulting in lower actual governor pressure.

The loss of 1-2 upshift is now corrected because at full throttle, the actual governor pressure is higher than the closed loop system believes it is providing. The early upshift and lack of 2-1 downshift/second gear start is corrected because the governor pressure is lower than the closed loop system believes it is providing due to the fact that the excitation voltage 104 is higher. The lower closed-to-light throttle governor pressure also prevents vacillation between first and second gears, because it is a manifestation of the early upshift problem. The controller system 100 in accordance with the present invention also has the added benefit that shift points can be adjusted to the user's preference, even if there are no problems that require correction. For a more detailed description of the features of the present invention, refer now to the following discussion in conjunction with FIG. 2.

Hardware

The controller system 100 in accordance with the present invention comprises a microcontroller 106 which includes an A/D converter 122 to measure throttle position and optionally monitor output voltage, a digitally controlled potentiometer 108 coupled to the microcontroller 106 for providing a range of excitation voltages. The controller system 100 further includes a voltage reference and summing amplifier 110 coupled to the potentiometer 108 and the PCM 12 to achieve the desired output excitation range and a current amplifier and limiter 112 for providing the excitation voltage output to be governor pressure sensor 16'. The system further includes an artificial load 114 for receiving the excitation voltage output from the PCM 102.

Firmware 204

The firmware 204 resides on the controller 100. The firmware 204 monitors vehicle speed and throttle position. An analog-to-digital (A/D) converter 122 is utilized to measure the throttle position as a varying DC voltage. The vehicle speed is measured by employing a counter in the firmware that is started and stopped on an interrupt from either overflow of the counter (minimum speed) or by the falling edge of the digital vehicle speed sensor signal 126. This count is then converted to a speed in a preferred embodiment by utilizing a lookup table within the firmware. The lookup table is generated by a software application and will be described later in the application.

The firmware in the controller 100 also calibrates the throttle position sensor 22' by saving the minimum and maximum voltages measured for a short period after power-up. The default values for minimum and maximum are set to a sufficiently narrow range to accommodate virtually any vehicle.

In the preferred embodiment, the firmware 204 allows for three modes of operation:

1. Throttle Position Mode;
2. Speed Mode; and
3. Combination Mode.

Each of these three modes will be described herein below.

Throttle Position Mode

Throttle Position Mode allows the user to have the excitation voltage ramp to or from a plateau based on throttle position. This ramp can be positive or negative.

Speed Mode

Speed Mode provides the same functionality as Throttle Position Mode, except the ramp is determined solely by vehicle speed.

Combination Mode

Combination Mode is basically Throttle Position Mode, with the excitation voltage clamped by the speed ramp. In other words, if speed mode limits the voltage to 4.5 volts at 50 MPH, the excitation voltage will not rise above this limit, regardless of throttle position. This mode is designed to prevent hyper-sensitive downshifting at higher speeds and in a light throttle application. In another preferred embodiment, the excitation voltage variation can be primarily determined by vehicle speed, with the throttle position information used for scaling or offsetting the output voltage.

Calibration of Throttle Position

The method of calibration is to turn the ignition key on (without starting the engine), then to press the throttle all the way to the floor and subsequently to release the throttle. Alternatively, one can simply turn the key to the on position while pressing the pedal all the way down, then turn the key off. The next time the key is turned on, the low throttle position will be calibrated.

Setting of Excitation Voltage

Depending on the mode setting, the firmware will set the excitation output voltage 104 based on user specified speed and/or throttle position. Both the throttle position and the speed measurements are averaged over a finite number of samples to mitigate the effects of electrical noise on the signals.

User Interface

The firmware also has a user interface 132 that can be accessed using an RS-232 terminal or terminal or terminal emulation application. This user interface 132 allows the user to view statistics and configuration data. These statistics are used mainly for development, but may be useful for troubleshooting by the user. The user interface 132 also allows the user to reset the Throttle Position Sensor calibration (TBS) calibration.

Software

The software provided external to the controller 100 generates a lookup table based upon user specified parameters. This software is an application that runs on a personal computer. It then stores the user preferences along with the lookup table in the controller 100 via the serial port 131.

The software generates the table to ramp from the starting voltage to the ending voltage either before the set point or after. This provides user selection of holding the start voltage until the set point then ramping to the end voltage or ramping from the start voltage to the end voltage at the set point and holding the end voltage beyond the set point. The ramp may or may not be linear, based on user preference and required performance. In a preferred embodiment, the range of excitation output voltages that the controller 100 provides is 4.0 to 6.0 volts, thereby providing a +−20% range of adjustment from a nominal excitation voltage of 5 volts.

Conclusion

A controller system in accordance with the present invention compensates the erroneous shift points in a transmission caused by adjustment of the line pressure beyond the manufacturer's specification ostensibly to mitigate clutch slippage by ramping the excitation voltage based upon engine and vehicle parameters. In so doing, upshift and downshift points are corrected. Furthermore, the settings for the excitation voltage range can be user-specified to accommodate a variety of vehicles.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art departing from the spirit and scope of the appended claims.

What is claimed is:

1. A system for controlling a transmission with an automotive vehicle, the automotive vehicle including a powertrain control module (PCM) and a governor pressure sensor coupled to the PCM, the system comprising:

a controller system for sensing at least one parameter of the vehicle, the controller system modifying signal to the governor pressure sensor based upon the at least one parameter wherein the controller system allows for three different modes of operation: a throttle position mode wherein the signal is only modified dependent on a throttle position, a speed mode wherein the signal is only modified dependent on speed, and a combination mode wherein the signal is modified dependent upon both the throttle position and the speed.

2. The system of claim 1 wherein the at least one parameter comprises throttle position.

3. The system of claim 1 wherein the at least one parameter comprises vehicle speed.

4. The system of claim 1 wherein the at least one parameter comprises throttle position and vehicle speed.

5. The system of claim 1 wherein the controller system further comprises:

a microcontroller coupled to the PCM for measuring the at least one parameter;

a potentiometer for providing a range of excitation voltages coupled to the microcontroller; and an amplifier coupled to the potentiometer for providing the excitation voltage output to the governor pressure sensor.

6. The system of claim 5 wherein the at least one parameter is any combination of throttle position and vehicle speed.

7. The system of claim 6 wherein the microcontroller contains firmware to monitor the vehicle speed and the throttle position.

8. The system of claim 7 wherein the vehicle speed is measured by a counter within the firmware and a count is converted into the appropriate speed by a look-up table.

9. The system of claim 7 wherein the firmware calibrates the throttle position by saving minimum and maximum voltages measured for a short period after start-up.

10. The system of claim 7 wherein the firmware allows for three modes of operation: throttle position mode, speed mode and combination mode.

11. A method for controlling a transmission for an automotive vehicle, the automotive vehicle including a powertrain control module (PCM) and a governor pressure sensor coupled to the PCM, the method comprising the steps of:

(a) sensing at least one parameter of the vehicle; and (b) modifying a signal to the governor pressure sensor based upon the at least one parameter; and (c) allowing for three different modes of operation, a throttle position mode wherein the signal is only modified dependent upon a throttle position, a speed mode wherein the signal is only modified dependent on speed, and a combination mode wherein the signal is modified dependent upon a combination of throttle position and speed.

12. The method of claim 11 wherein the at least one parameter comprises throttle position.

13. The method of claim 11 wherein the at least one parameter comprises vehicle speed.

14. The method of claim 11 wherein the at least one parameter comprises throttle position and vehicle speed.

15. An automotive vehicle comprising:

a powertrain control module (PCM);

a governor pressure sensor coupled to the PCM; and a controller system for sensing at least one parameter of the vehicle, the controller system for modifying signal to the governor pressure sensor based upon the at least one parameter, wherein the controller system allows for different three modes of operation: a throttle position mode wherein the signal is only modified dependent on a throttle position, a speed mode wherein the signal is only modified dependent on speed, and a combination mode wherein the signal is only modified dependent upon both the position and the speed.

16. The automotive vehicle of claim 15 wherein the at least one parameter comprises throttle position.

17. The automotive vehicle of claim 15 wherein the at least one parameter comprises vehicle speed.

18. The automotive vehicle of claim 15 wherein the at least one parameter comprises throttle position and vehicle speed.

19. An automotive vehicle comprising:

a powertrain control module (PCM);

a governor pressure sensor coupled to the PCM; and a controller system for sensing at least one parameter of the vehicle, the controller system for modifying an excitation voltage to the governor pressure sensor based upon the at least one parameter, wherein the controller system further comprises:

a microcontroller coupled to the PCM for measuring the at least one parameter;

a potentiometer for providing a range of excitation voltages coupled to the microcontroller; and an amplifier coupled to the potentiometer for providing the excitation voltage output to governor pressure sensor.

* * * * *